3,488,860
FILTER TRAY FOR FREEZE DRYING
Charles E. Bender, Taylor N. Thompson, and Douglas S. Fraser, New Paltz, N.Y., assignors to The Virtis Company, Inc., Gardiner, N.Y., a corporation of New York
Filed Oct. 9, 1967, Ser. No. 673,713
Int. Cl. F26b 25/18
U.S. Cl. 34—238     6 Claims

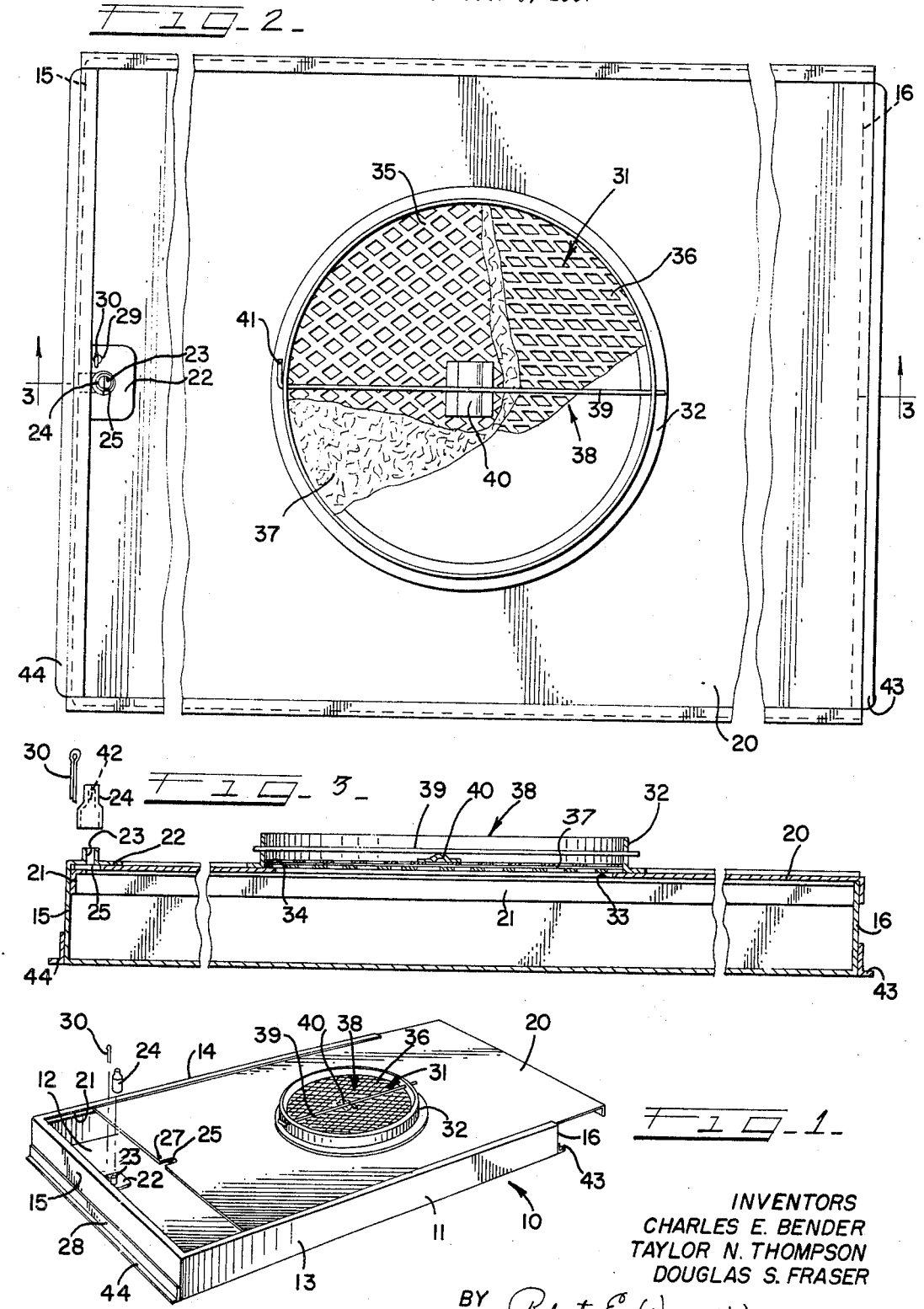
Jan. 13, 1970    C. E. BENDER ET AL    3,488,860
FILTER TRAY FOR FREEZE DRYING
Filed Oct. 9, 1967
INVENTORS
CHARLES E. BENDER
TAYLOR N. THOMPSON
DOUGLAS S. FRASER
BY Robert E. Wagner
ATT'Y

ABSTRACT OF THE DISCLOSURE

A filter tray for use in freeze drying having a removable cover with a centrally located filter assembly consisting of two coarse screens clamping a coarse paper filter therebetween. Means is formed on the tray to permit clamping to a heating or cooling shelf for good heat transfer. When the cover is closed, a temperature sensor may be inserted through a self-valving port.

---

This invention relates to trays or receptacles particularly adapted for use in freeze drying and, more specifically, is directed to a new and improved filter tray having a novelly mounted filter means.

Freeze drying of materials for medicinal use has been accomplished for many years. Basically, drying by this method consists of first freezing material, subjecting it to a high-vacuum and controlled heat input so that the water content of the material is selectively removed through sublimation. By definition, in sublimation, ice goes directly to water vapor while bypassing the intermediary liquid phase. Freeze drying results in a dry material which may be preserved for an indefinite period.

Problems of confining the sublimate are encountered during freeze drying particularly where the residual solid is light and fluffy. In going from a solid state to a vapor phase, a tremendous pressure differential exists between the interior of the tray or receptacle housing the frozen material and the ambient which serves to force the material from the tray. In a typical freeze drying installation, product shelves are provided in a chamber or module, which shelves may be electrically heated or heated and cooled with a liquid heat transfer media to provide a freezing chamber. The chamber or module in which the filter tray is housed is subjected to a high vacuum during the sublimating process. The product and residual solid must be contained within the tray, yet means must be provided to permit effective communication with the exterior of the tray to permit the water vapor to pass.

The present invention relates to a new and improved tray of uncomplicated constuction which may be fabricated in an economical manner. The tray of the present invention includes a cover which is slidably interlocked with the bottom portion of the tray. The cover is provided with a pair of coarse filter screens, at least one of which is removable to permit the placement of a coarse paper filter therebetween, forming a filter sandwich for use in confining the product or material to be sublimated. If indication of the internal temperature is desired, an access port having a flexible valve cover is available which permits insertion of a heat detecting probe such as a thermister or the like. Locking means is also provided to assure the retention of the cover on the receptacle or pan during handling. In a typical application, the filter tray may be formed from stainless steel or equivalent noncorrosive material and, as will be seen, is economically fabricated.

It is an object of this invention to provide a new and improved filter tray assembly for use in freeze drying of various materials.

It is a further object of this invention to provide a new and improved tray for confining materials during freeze drying, the tray having a novel filter means which permits communication between the interior and exterior of the tray while maintaining the substance completely confined.

It is a still further object of this invention to provide a new and improved filter tray and cover assembly having means to permit access of a heat-detecting probe into the interior of the tray without risking loss or contamination of the material undergoing freeze drying.

Objects other than those specifically set forth will become apparent upon consideration of the following description made in conjunction with the drawings.

In the drawings:

FIGURE 1 is a perspective view of a filter cover and tray assembly with the cover partially removed and detailed parts shown in exploded perspective;

FIGURE 2 is an enlarged top, broken plan view of the filter cover and tray assembly shown in FIGURE 1 with the cover fully closed and parts assembled and having a portion of the filter cover broken away; and FIGURE 3 is a cross-sectional view taken generally along the line 3—3 of FIGURE 2 and illustrating the cover in the closed position.

Referring now to FIGURE 1, a filter tray assembly is indicated generally by the reference numeral 10 and includes a receptacle 11 having a bottom wall 12, side walls 13 and 14, and end walls 15 and 16. For best use of space in the module or sublimating chamber, the tray of the present invention is of rectangular shape. Obviously, other shapes may be used, depending upon the chamber configurations.

A cover 20 of generally rectangular form is slidably received in guide channels formed in the opposite side walls 13 and 14. As seen in FIGURE 3, a similar channel is provided in the end wall 15 with all the guide channels formed by joining an angle strip 21 along the wall immediately below the integral inturned flange formed at the upper end of each wall. The end wall 15 includes an inwardly projecting pedestal 22, located above the level of the cover 20 and supporting an upwardly extending port 23 communicating with the interior of the tray. The port 23 is closed at its outer end by means of an elastomeric valve 24 which, as will be described in greater detail below, permits access to the interior of the tray. A U-shaped slot 25 is formed in the inner end of the cover 20 to permit the cover to be completely closed without cutting off communication with the interior of the chamber through the port 23.

As seen in FIGURE 2, when the filter cover 20 is completely closed, an aperture 27 in the cover (FIGURE 1) is aligned with an aperture 28 in the pedestal. A cotter pin 30 or similar lock may be inserted into the aligned apertures 27 and 28 to lock the cover in place, preventing inadvertent displacement during handling.

Referring to FIGURES 1–3, the central portion of the cover 20 is provided with a filter assembly 31, consisting of an annular housing 32 which is welded or secured by equivalent means to the cover 20. The housing 32 surrounds an opening 33 (FIGURE 3 only) which is of lesser dimension, forming a ledge 34 radially inwardly of the inner periphery of the housing 32. A filter screen of coarse mesh 35 rests on the ledge 34 to form the lower half of the filter sandwich shown in FIGURES 2 and 3. A second screen 36 overlies a coarse paper filter disc 37 and a locking means indicated generally at 38 clamps the sandwich in operative position.

The locking means 38 may consist of a stiff wire 39 with a pressure distribution pad 40 at the central portion. One end of the wire is bent as at 41 to assure retention of the wire with the cover during handling. As is apparent, the wire 39 may be moved toward its bent end to release the free or unbent opposite end from engagement with the housing 32, permitting it to be elevated, the coarse screen 36 removed, and the coarse paper filter 37 replaced.

When a material is enclosde in the tray and the cover positioned as shown in FIGURE 2, the port 23 is closed off by the rubber stopper 34 which is provided with a pierced self-closing aperture 42 shown in dotted lines. The rubber stopper may be of any desired type, however, for economic reasons, it is preferably a stopper of a known type, commonly used on serum bottles and containers for medicines. The pierced aperture 42 permits the insertion of a heat-detecting probe, such as a thermistor or the like, which will permit detection of the temperature in the interior of the tray throughout the sublimating process. As can be appreciated, the over-all simplified construction of the tray permits the components of the tray assembly 10 to be easily disassembled for sterilization, washing or the like.

At opposite ends of the tray are provided a pair of outwardly projecting flanges 43 and 44 which, in the preferred form, are coextensive with the bottom of the tray. These flanges co-operate with clamps of known type in the sublimating module or chamber to permit the bottom of the pan to be tightly pressed against the shelf on which it is located. In this manner, good heat transferring contact between the pan and shelf is assured.

It can be appreciated that the filter tray assembly of the present invention is economically fabricated and is of rugged construction to withstand the normal abuse in laboratory use. The filter tray functions to confine materials during sublimation while permitting equalization of the pressure interiorly and exteriorly through the coarse paper filter and allowing the water vapor to pass where it may be condensed and drawn off. The importance of maintaining the sublimated material confined is better appreciated when one considers its possible adverse effect on a vacuum pump if allowed to enter the intake. Moreover, by being confined, the clearliness of the freeze drying chamber is maintained, as well as assuring the availability of a maximum volume of the sample dried.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:
1. In a filter-type tray assembly for use in confining materials during freeze drying, said filter tray assembly comprising a receptacle having a bottom wall and side walls and end walls to receive the material to be dried, a cover removably joined to said receptacle and forming a top wall to close off the interior of said receptacle and encapsulate said material to be dried, said cover including a filter means to permit fluid communication of the interior of said receptacle with the ambient, said filter means permitting pressure equalizaion during freeze drying while maintaining the material undergoing sublimation confined within said receptacle, said filter means including a first screen disposed around an opening in said cover, a second screen in axially opposed relation to said first screen, a coarse filter paper means disposed between said first and second screens and means to maintain said screens in clamping relation to said filter cover, said last-named means permitting removal of said second screen for access and replacement of said coarse filter paper means.

2. The filter tray of claim 1 wherein said opening is surrounded by a housing, said first screen being of greater dimension than said opening but of lesser dimension than said housing to overlie a part of said cover, and said means clamping said screens including a wire, engageable with said second screen and having opposite ends received in said housing.

3. In a filter-type tray assembly for use in confining materials during freeze drying, said filter tray assembly comprising a receptacle having a bottom wall and side walls and end walls to receive the material to be dried, at least two of said walls having laterally extending flange means formed adjacent the lower margin thereof, said flange means being adapted for use in releasably clamping said receptacle to a supporting surface to provide full engagement of said bottom wall therewith for uniform heat transfer to all portions of said receptacle, a cover removably joined to said receptacle and forming a top wall to close off the interior of said receptacle and encapsulate said material to be dried, said cover including a filter means to permit fluid communication of the interior of said receptacle with the ambient, said filter means permitting pressure equalizaion during freeze drying while maintaining the material undergoing sublimation confined within said receptacle.

4. The filter tray assembly of claim 3 wherein said receptacle is of generally rectangular shape and includes a pair of spaced apart, inwardly projecting flanges disposed along opposite side walls, said inwardly projecting flanges being in spaced relation to a flange formed at the upper end of said side wall and forming therewith a channel to slidably receive said cover, said spaced apart flanges maintaining said cover and receptacle in assembled relation as a unit while permitting lateral removal of said cover.

5. A filter tray assembly of claim 3 wherein said cover and said receptacle are provided with apertures, said apertures being adapted for alignment when said cover is in closed relation to said receptacle and locking means inserted into said aligned apertures to prevent inadvertent displacement of said cover.

6. In a filter-type tray asesmbly for use in confining materials during freeze drying, said filter tray assembly comprising a receptacle having a bottom wall and side walls and end walls to receive the material to be dried, a cover removably joined to said receptacle and forming a top wall to close off the interior of said receptacle and encapsulate said material to be dried, said cover including a filter means to permit fluid communication of the interior of said receptacle with the ambient, said filter means permitting pressure equalization during freeze drying while maintaining the material undergoing sublimation confined within said receptacle, said receptacle including a port at one end, resilient means closing off said port, said resilient means having a self-valving aperture therethrough to permit insertion of a heat detector into said receptacle without permitting loss of contents therefrom.

References Cited
UNITED STATES PATENTS

| 85,647 | 1/1869 | Dolan | 220—41 |
| 145,713 | 12/1873 | Armstrong | 34—235 |
| 926,537 | 6/1909 | Bagley | 220—41 |
| 1,121,186 | 12/1914 | Hume | 34—238 |
| 1,429,997 | 9/1922 | Ayres | 34—238 |
| 2,393,578 | 1/1946 | Waite. | |
| 2,759,623 | 8/1956 | Hammerquist. | |
| 2,897,973 | 8/1959 | Sizemore | 34—237 XR |

FREDERICK L. MATTESON, JR., Primary Examiner

HARRY B. RAMEY, Assistant Examiner

U.S. Cl. X.R.

220—41